United States Patent
Schultz (10) Patent No.: US 8,515,847 B2
(45) Date of Patent: Aug. 20, 2013

(54) SYSTEM AND METHOD FOR PASSWORD-FREE ACCESS FOR VALIDATED USERS

(75) Inventor: Michael J. Schultz, San Jose, CA (US)

(73) Assignee: Microfolio Data, LLC, Dover, DE (US)

( * ) Notice: Subject to any disclaimer, the term of this patent is extended or adjusted under 35 U.S.C. 154(b) by 1462 days.

(21) Appl. No.: 12/142,727

(22) Filed: Jun. 19, 2008

(65) Prior Publication Data

US 2009/0265773 A1    Oct. 22, 2009

Related U.S. Application Data

(63) Continuation-in-part of application No. 12/118,135, filed on May 9, 2008.

(60) Provisional application No. 61/046,383, filed on Apr. 18, 2008.

(51) Int. Cl.
G06Q 40/00    (2012.01)

(52) U.S. Cl.
USPC ............................................. 705/36; 705/35

(58) Field of Classification Search
USPC ................................................. 705/44, 36, 35
See application file for complete search history.

(56) References Cited

U.S. PATENT DOCUMENTS

| | | | |
|---|---|---|---|
| 5,771,354 A | 6/1998 | Crawford | |
| 6,263,447 B1 | 7/2001 | French | |
| 6,295,605 B1 * | 9/2001 | Dockter et al. | 713/166 |
| 6,917,923 B1 | 7/2005 | Dimenstein | |
| 7,027,807 B2 | 4/2006 | Keller | |
| 7,089,585 B1 | 8/2006 | Dharmarajan | |
| 7,225,263 B1 | 5/2007 | Clymer et al. | |
| 7,593,000 B1 | 9/2009 | Chin | |
| 7,668,738 B2 | 2/2010 | Wiggins | |
| 7,725,128 B2 | 5/2010 | Marsh | |
| 2002/0049806 A1 | 4/2002 | Gatz et al. | |
| 2002/0065885 A1 | 5/2002 | Buonanno | |
| 2002/0083008 A1 | 6/2002 | Smith et al. | |
| 2002/0152265 A1 * | 10/2002 | Felman | 709/203 |

(Continued)

FOREIGN PATENT DOCUMENTS

| | | |
|---|---|---|
| KR | 20020088023 | 11/2002 |
| WO | 0169406 | 9/2001 |

(Continued)

OTHER PUBLICATIONS

Business_Credit; "Man-in-the-middle phishing attack successful against Citibank's two-factor token authentication"; Oct. 2006; ISSN: 0897-0181.*

(Continued)

*Primary Examiner* — Edward Chang
(74) *Attorney, Agent, or Firm* — Stolowitz Ford Cowger LLP (57) ABSTRACT

A new approach is proposed that first validates identity of a user/individual who is initiating a request for a web service for the first time. Once validated, the user is allowed to access the web service, to register securely with the provider of the web service, and to create a series of personalized questions to be used for future validation purposes. During the user's subsequent request for the web service, the user will be asked, in addition to his/her user name, one or more of the personalized questions he/she created on rotation basis in place of a PIN or password.

17 Claims, 2 Drawing Sheets

(56) References Cited

U.S. PATENT DOCUMENTS

| | | |
|---|---|---|
| 2003/0041108 A1 | 2/2003 | Henrick |
| 2004/0038690 A1 | 2/2004 | Lee et al. |
| 2004/0097217 A1 | 5/2004 | McClain |
| 2005/0039057 A1* | 2/2005 | Bagga et al. ............ 713/202 |
| 2005/0097106 A1 | 5/2005 | Lineman |
| 2005/0102407 A1 | 5/2005 | Clapper |
| 2005/0171999 A1 | 8/2005 | Bond et al. |
| 2005/0240960 A1 | 10/2005 | Nagtzaam |
| 2005/0268107 A1 | 12/2005 | Harris |
| 2006/0036868 A1 | 2/2006 | Cicchitto |
| 2006/0084472 A1 | 4/2006 | Park |
| 2006/0095369 A1 | 5/2006 | Hofi |
| 2006/0101127 A1 | 5/2006 | Brown |
| 2006/0121880 A1 | 6/2006 | Cowsar et al. |
| 2006/0161435 A1 | 7/2006 | Atef et al. |
| 2006/0191005 A1 | 8/2006 | Muhamed et al. |
| 2006/0265243 A1 | 11/2006 | Racho et al. |
| 2007/0142039 A1 | 6/2007 | Bushnell |
| 2007/0214354 A1 | 9/2007 | Renaud |
| 2008/0003996 A1 | 1/2008 | Strandell |
| 2008/0059592 A1 | 3/2008 | Marsh |
| 2008/0098062 A1 | 4/2008 | Balia |
| 2008/0102766 A1 | 5/2008 | Schultz |
| 2008/0102790 A1 | 5/2008 | Schultz |
| 2008/0104188 A1 | 5/2008 | Oliver et al. |
| 2008/0288299 A1 | 11/2008 | Schultz |
| 2009/0007245 A1 | 1/2009 | Schultz |
| 2009/0265773 A1 | 10/2009 | Schultz |
| 2009/0305667 A1 | 12/2009 | Schultz |
| 2010/0279720 A1 | 11/2010 | Schultz |

FOREIGN PATENT DOCUMENTS

| | | |
|---|---|---|
| WO | 2008030287 | 3/2008 |
| WO | 2008054554 | 5/2008 |
| WO | 2008054555 | 5/2008 |
| WO | 2009128850 | 10/2009 |
| WO | 2009154635 | 12/2009 |

OTHER PUBLICATIONS

Wolfe, Daniel; "In Brief: Wis. CU Tests Corillian Product"; American Banker; Nov. 1, 2005; ISSN: 0002-7561.*

Furnell, S M; Papadopoulos, I; Dowland, P; "A long-term trial of alternative user authentication technologies"; 2004, ISSN: 0968-5227, Journal Code: IMCS.*

Stolowitz Ford Cowger LLP; Related Case Listing; Oct. 12, 2011; 1 Page.

International Search Report and Written Opinion for PCT/US07/14329; dated Jan. 10, 2008; 7 Pages.

International Search Report and Written Opinion for PCT/US07/14416, dated Jan. 20, 2008; 8 Pages.

International Search Report and Written Opinion and IPRP; PCT/US07/14415; dated Aug. 25, 2008; 2 Pages.

International IPRP and Written Opinion; PCT/US08/067557; dated Oct. 19, 2010; 5 Pages.

International IPRP and Written Opinion; PCT/US08/069092; dated Dec. 21, 2010; 5 Pages.

Roman Shtykh et al.; Designing of Peer-to-Peer Groupware Integrated with Interactive Browser for Active Information Sharing and Collaboration Support; Proceedings of te Fourth International Conference on Computer and Information Technology 2004; IEEE; 6 Pages.

Yuechen Qian et al.; Exploring the Potentials of Combining the Photo Annotating Tasks with Instant Messaging Fun; MUM 2004; Oct. 27-29, 2004; College Park, Maryland; 7 Pages.

Eric Evans et al.; Using Java Applets and Corba for Multi-User Distributed Applications; University of Texas at Austin; IEEE Internet Computing; May-Jun. 1997; 13 Pages.

John Heidemann et al.; Modeling the Performance of HTTP Over Several Transport Protocols; IEEE/ACM transactions on Networking, vol. 5, No. 5, Oct. 1997; 15 Pages.

U.S. Appl. No. 11/673,490, filed Feb. 9, 2007, Integrated instant messaging and web browsing client and related methods, Patent No. 2008-0059592.

U.S. Appl. No. 11/789,742, filed Apr. 24, 2007, System and method for user identity verification via mobile communication devices, Patent No. 2008-0102790.

U.S. Appl. No. 11/789,495, filed Apr. 24, 2007, System and method for user identity authentication via mobile communication devices, Patent No. 2008-0102766.

U.S. Appl. No. 12/118,135, filed May 9, 2008, System and method for user identity validation for online transactions, Patent No. 2008-0288299.

U.S. Appl. No. 12/167,188, filed Jul. 2, 2008, System and method for controlled content access on mobile devices, Patent No. 2009-0007245.

U.S. Appl. No. 12/387,681, filed May 6, 2009, Method and system for mobile identity verification and security, Patent No. 2009-0305667.

U.S. Appl. No. 12/799,033, filed Apr. 16, 2010, Integrated instant messaging and web browsing client and related methods, Patent No. 2010-0279720.

PCTUS07/014415, filed Jun. 19, 2007, Integrated instant messaging and web browsing client and related methods, Patent No. WO08/030287.

PCTUS07/014329, filed Jun. 19, 2007, System and method for user identity verification via mobile communication devices, Patent No. WO08/054554.

PCTUS07/014416, filed Jun. 19, 2007, System and method for user identity authentication via mobile communication devices, Patent No. WO08/054555.

PCTUS08/067557, filed Jun. 19, 2008, System and method for password-free access for validated users, Patent No. WO09/128850.

PCTUS08/069092, filed Jul. 2, 2008, System and method for controlled content access on mobile devices, Patent No. WO09/154635.

* cited by examiner

SYSTEM AND METHOD FOR PASSWORD-FREE ACCESS FOR VALIDATED USERS

RELATED APPLICATIONS

This application is a continuation in part of U.S. patent application Ser. No. 12/118,135, filed May 9, 2008, and entitled "System and Method for User Identity Validation for Online Transactions" by Michael J. Schultz, which claims priority to U.S. Provisional Patent Application No. 61/046,383, filed Apr. 18, 2008, and entitled "Digital Identity Validation for Fraud Protection", by Michael J. Schultz, and all of which are hereby incorporated herein by reference.

BACKGROUND

In prior times, identity related fraud was limited to transactions where the fraudulent party was always present to perpetrate the identity fraud whether by means of forged checks, improper use of bank or credit accounts, scamming money off an unsuspecting victim or pretending to be someone other than who that person was in real life to obtain funds or perpetrate harm. Since the advent of widespread use of the internet in early 1990's, the internet has served as a platform for a variety of e-commerce venues, which allows and even encourages more participation in various aspects of digital life such as online banking, buying products from online merchants via credit cards, sending text messages to one another, interacting with others in social networks either as an user or part of a group. Consequently, crimes related to identity theft have become an increasingly serious threat with 53% of all fraud done online, representing a multi-billion dollar loss to the industry.

There are various technologies current being employed to avoid identity-related fraud online. Many require the use of a user name along with a PIN or password to access various services and databases provided online. When a higher degree of security is desired, technologies involving hardware devices such as a fingerprint reader or a USB key can be employed. Additionally, other technologies that have been utilized include but are not limited to, identifying Media Access Control (MAC) address of a device used to participate in a digitally based interaction, sniffing the IP address to confirm if the originating address is the anticipated one, determining the identity by accessing credit reporting agencies, and requesting forensic report of previous purchase discrepancies associated with the user name, data or credit card as well as manual review of purchases including outbound call centers to validate that the consumer has actually placed an order. These hardware-reliant technologies are designed to minimize or eliminate human interaction, relying instead on complex algorithms to define if an online user is actually the person he/she proclaimed to be while requiring only minimal interaction with the user him/herself to prove identity. Although these solutions offer a higher degree of security, they are cumbersome, restrictive and require a higher level of user compliance to be effective. On the other hand, the alternative of using user names, PINs, and passwords to access certain web-based applications or contents opens up vulnerabilities to services and databases. As people are constantly being required to create PINs and passwords, they may in most cases simply adopt a single PIN/password or put the PINs and passwords down in writing. PIN/password so created and/or kept may often be forgotten, misplaced, or simply lost by the user, causing a huge gap in security for any web-based system.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

The features and objects of the disclosure are illustrated by way of example in the accompanying drawings. The drawings should be understood as illustrative rather than limiting.

DETAILED DESCRIPTION OF EMBODIMENTS

The specific embodiments described in this document represent examples or embodiments of the present invention, and are illustrative in nature rather than restrictive. In the following description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" or "some embodiments" means that a particular feature, structure, or characteristic described in connection with the embodiment is included in at least one embodiment of the invention. Features and aspects of various embodiments may be integrated into other embodiments, and embodiments illustrated in this document may be implemented without all of the features or aspects illustrated or described.

A new approach is proposed that first validates identity of a user/individual who is initiating a request for a web service for the first time. Once validated, the user is allowed to access the web service, to register securely with the provider of the web service, and to create a series of personalized questions to be used for future validation purposes. During the user's subsequent request for the web service, the user will be asked, in addition to his/her user name, one or more of the personalized questions he/she created on rotation basis in place of a PIN or password. Such a validation/access process occurs online in real time by the user in person to avoid unnecessary delays that might otherwise be incurred if validation occurs by telephone call, mail, internet, and other traditional validation methods.

The process described above acts as an additional layer of identity management to any existing enterprise that provides web services to users. Since the personalized questions are based on the user's own personal experiences in life, they tend to be "unforgettable" by the user, yet such questions remain to be totally confidential to anyone but the user him/herself. Consequently, the process protects against identity theft without the complexity of a hardware solution or the potential security gap caused by the PIN/password approach. As used in the present disclosure, the term "validation" or "verification" shall be defined as confirmation of an identity of a user.

Figure 1:
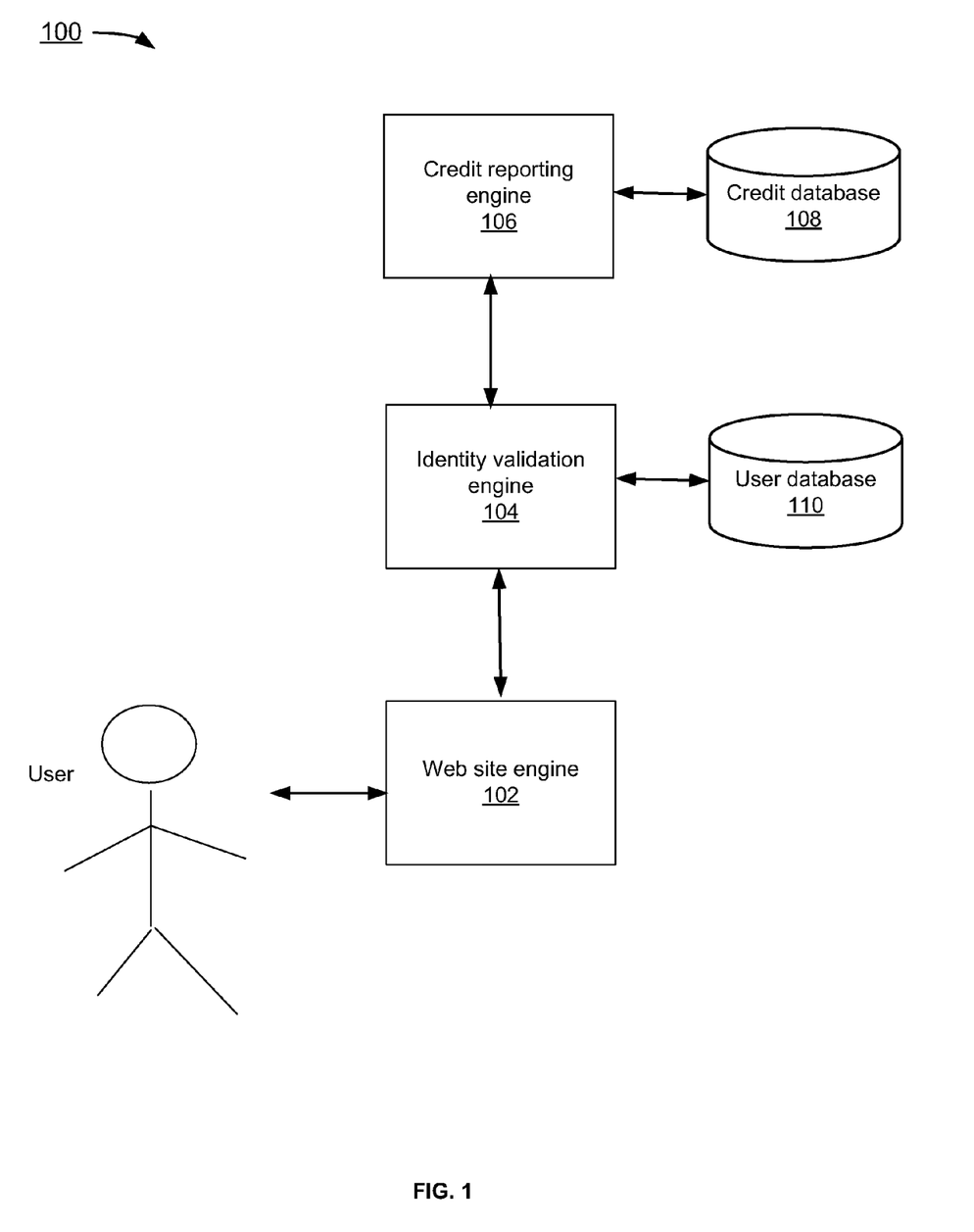
FIG. 1 shows an example of a system to support password-free access for validated users.

FIG. 1 shows an example of a system to support password-free access for validated users. In the example of FIG. 1, the system 100 includes a web service engine 102, a validation engine 104, a credit reporting engine 106, a credit database 108 coupled to the credit reporting engine 106, and a user database 110 coupled to the web service engine 102 and/or the validation engine 104. The term "engine," as used herein, generally refers to any combination of software, firmware, hardware, or other component that is used to effectuate a purpose.

In the example of FIG. 1, each of the web service engine 102, the validation engine 104, the credit reporting engine 106, the credit database 108 and the user database 110 communicates with others via one or more communication interfaces (not shown). Here, a communication interface is a software component that enables the web service engine 102, the validation engine 104, the credit reporting engine 106, and the credit database 108 to reach, communicate with, and/or exchange information/data/files with each other via a network by invoking agreed-upon interfaces, such as Application Programming Interfaces (APIs), and following certain agreed-upon communication protocols, such as TCP/IP protocol, wireless protocol, or any standard communication protocols.

In the example of FIG. 1, each of the web service engine 102, the validation engine 104, the credit reporting engine 106, the credit database 108, and the user database 110 communicates with others over a network (not shown). Here, the network can be a communication network based on certain communication protocols, such as TCP/IP protocol. Such network can be, but is not limited to, internet, intranet, wide area network (WAN), local area network (LAN), wireless network, Bluetooth, WiFi, WiMAX, satellite, cellular, and mobile communication networks. The physical connections of the network and the communication protocols are well known to those of skill in the art.

In some embodiments, some or all of the web service engine 102, the validation engine 104, the credit reporting engine 106, the credit database 108, and the user database 110 communicate with each other via one or more virtual private networks (VPN), which can be a high-speed dedicated network that permits the transfer of large amounts of data with limited transmission lag time. Through the use of a private and dedicated network, or shared network with aggregate high bandwidth and potentially Quality of Service (QoS) guarantees or priorities, communications of all forms are received by recipient in a near instantaneous form with little perceptible delay. In addition, the parties may communicate with each other via an e-mail, an instant messaging (IM), short messaging system (SMS), a multimedia messaging system (MMS), Wireless Application Protocol (WAP), or any other method suitable for distributed or mobile communication. This variety enables communication between the parties even on disparate platforms and mobile operating systems, to communicate via one or more of: structured data, numbers, text, voice, and images. In one embodiment, the communication is nearly instantaneous. However, the approach also works in asynchronous environments. For example, a user may receive a message, such as via email, which initiates an interaction between the user and the validation engine 104, wherein the security of that interaction is enhanced by that interaction being time limited.

In the example of FIG. 1, the web service engine 102, the validation engine 104, and the credit reporting engine 106 are operable to provide services on behalf of an online service provider, a third party validator, and a credit reporting agency, respectively, via one or more hosting devices (hosts). Here, a host can be a computing device, a communication device, a storage device, or any electronic device capable of running software. For non-limiting examples, a computing device can be but is not limited to, a laptop PC, a desktop PC, a tablet PC, or a server machine. A storage device can be but is not limited to a hard disk drive, a flash memory drive, or any portable storage device. A communication device can be but is not limited to a mobile or cellular phone.

In the example of FIG. 1, the web service engine 102 provides a web service to a user over the network. Such web service enables the user to, for non-limiting examples, access web content, invoke a web-based application, or conduct an online transaction. When the user initiates access to the web service with the web service engine 102 for the first time, the web service engine will first request validation of the identity of the user from the validation engine 104. To this end, the web service engine 102 requests certain personal data of the user, which may include but is not limited to, name, address, telephone number, e-mail address, etc., and provides such information to the validation engine 104 to verify the user's identity.

In the example of FIG. 1, the identity validation engine 104 validates the identity of the user upon the request of the web service engine 102. More specifically, the identity validation engine 104 is given certain information of the user from the web service engine 102 that is requesting the identity validation. The identity validation engine 104 then provides such information of the user to the credit reporting engine 106 either individually or as a batch, which provides a set of Knowledge Based Authentication (KBA) questions in return. Here, the set of KBA questions are generated by the credit reporting engine 106 based on credit profile of the user retrieved from the credit database 108. These questions are generally "out of wallet" type questions that do not contain personally identifying information of the user and are not related to the person's credit cards, personal data used to identify them, or commonly known information of the user. Currently, information from the user's credit files has been used to authorize access to online accounts for credit file reporting (e.g., Experian at creditexpert.com) or for lost account passwords with a credit card issuer (e.g., Chase at chase.com). However, such information has not been utilized for online identity validation.

In one embodiment of FIG. 1, the credit reporting engine 106 performs a reverse lookup for the user's social security number using the user's information provided by the identity validation engine 104. Based on the user's social security number, the credit reporting engine 106 is able to retrieve the user's profile and/or credit history from the credit database 108, and generates a set of KBA questions that are specifically tailored based on the user's profile and/or credit history. For non-limiting examples, the set of KBA questions may include but are not limited to, a specific transaction on a specific date, the location of a recent transaction, prior addresses or phone numbers, etc. Once the user's responses to the set of KBA questions are retrieved and provided to the credit reporting engine 106 by the identity validation engine 104, the credit reporting engine 106 may rate or grade the responses and provide the grading back to the identity validation engine 104.

In the example of FIG. 1, the credit database 108 coupled to the credit reporting engine 106 can include both public and/or private databases. The database 108 is operable to store and manage identity, profile, and/or credit history of the user, wherein such information may include but is not limited to, credit scores, transaction history, reported incidents or issues regarding previous transactions made by the user. In addition, the database may also contain KBA questions and answers or the database may be used to generate KBA questions and answers tailored to each user's credit and/or transaction history. Here, the term database is used broadly to include any known or convenient means for storing data, whether centralized or distributed, relational or otherwise. Due to their sensitive nature, records in the credit database 108 should be highly secured and optionally encrypted. Such record can be indexed and be made searchable via any of the information of the user, such as credit card number, social security number, name, or telephone number upon request. In one embodiment, the KBA questions do not contain personally identifying information, but rather person-specific information, and therefore does not compromise the security of the credit reporting engine 106 or database 108 or the user's identity. In one embodiment, the selection of KBA questions to ask the user varies from one transaction to another, thereby limiting the potential damage if the KBA questions and their answers are somehow intercepted or otherwise compromised. In one environment, sensitive personally identifying information, such as social security number, are not disclosed by the credit reporting engine 106, but rather are used internally to generate KBA questions and answers, which are much less sensitive that the personally identifying information.

In the example of FIG. 1, the identity validation engine 104 provides the set of KBA questions to the user once the questions are generated via the web service engine 102, which, at least in some embodiments, may then present (e.g., display or speak via computer generated voice) the KBA questions automatically to the user for validation of the user's identity. Alternatively, the KBA questions may be submitted to the user through a different device than used for providing the web service, for a non-limiting example, the user's cellular phone or an email device. In some embodiments, the identity validation engine 104 may directly provide the KBA questions to the user and receive responses without using the web service engine 102 as an intermediary.

In the example of FIG. 1, the identity validation engine 104 retrieves the responses to the KBA questions from the user, if such responses are provided in a timely manner, for the credit reporting engine 106 to review. For example, the user has a timed window to correctly reply to the questions after which they are graded for accuracy or the validity of his/her identity will be denied by the identity validation engine 104. The window utilizes a chronological module (not shown) that can configure the response time from a few seconds to a few minutes, to avoid the user from "looking up" the answers to the KBA questions by referencing to other sources, such as the actual credit report from which the KBA questions are generated.

In the example of FIG. 1, the validation engine 104 will decline to confirm the identity of the user if validation is not completed within an allotted time span (such as due to slow response by the user) or is denied because the rating/grading of the responses to the KBA questions by the credit reporting engine 106 is negative. Consequently, the web service engine 102 will be alerted of a potential identity theft and the web service request initiated by the user will be declined. If the rating of the responses to the questions by the user is positive (and preferably, timely), the identity validation engine 104 will notify the wed service engine 102 that the user's identity has been verified.

In the example of FIG. 1, the validation engine 104 will allow the user to register securely at the web service engine 102 for the requested web service once the identity of the user is validated. In addition to providing his/her personal information and creating his/her username as part of the user's profile during the registration, the user is asked to create a series of personalized challenge questions (PCQs) based on his/her personal life experiences and provide his/her personalized answers to them. Unlike KBAs, PCQs are not related to the credit history or profile of the user. Rather, PCQs are based on the personal life of the user that only the user him/herself knows the answers, thus are highly confidential while the user does not need to remember the answers to them. The followings are some non-limiting examples of PCQs:

In what city was your first elementary school?
In what city were you living at age 14?
What was your childhood nickname?
What was the last name of your childhood best friend?
In what city were you born?
In what city was your mother born?
In what city was your father born?
In what city were you at the turn of the millennium?
What was the name of the street where you grew up?
What is your pet's name?
What was your first pet's name?
What's your favorite color?
What's your grandfather's first name?
What's your grandmother's first name?
What's your father's middle name?

These PCQs can be rotated and randomly chosen to maintain sufficient barriers to identity cloning or phreaking. Use of PCQs as access for validated identities has universal application including, but not limited to, financial transactions, social networking, enterprise access to restricted data and pin-less/password free access to personal accounts online. In addition to offering standard PCQs, it is also possible to have user defined PCQs and responses that further add to security. One logical approach is to have wild card PCQs in which a user-defined answer is presented and a choice of multiple questions are presented, requiring the user to select which is the correct question from those displayed.

In the example of FIG. 1, the validation engine 104 will associate the PCQs and their answers rest of the user's profile including his/her username provided during registration and save them in the user database 110 or in a local database of the validation engine 104. Here, the answers to the PCQs are unique as they are based on the real events happened in the user's personal life. The next time when the user initiates another request for a web service provided by the web service engine 102, the validated user will be prompted to enter his/her username. Instead of being asked for the PIN or password associated with the username, the user will be asked one or more of the PCQs randomly picked from the set of PCQs the user created during registration. The web site engine 102 will accept the answers to the randomly picked PCQs by the users, and provide the answers to the validation engine 104. The validation engine 104 will then retrieve answers to the PCQs previously saved in the user database 110 and compare them to the answers currently provided by the user. If the answers to the PCQs match, the user's request for the web service will be granted. Otherwise, the user's access will be denied just as when the user fails to provide a correct PIN/password.

In some embodiments, the validation engine 104 may utilize an interactive voice response (IVR) system for the identity validation process. The user may be required to register his/her voice in a database for validation purposes. In some embodiments, the user may be required to "voice print" him/herself multiple times. Then the user is required to answer the KBA and/or PCQ questions during validation and the validation engine 104 will match the voice with the voice print stored with the user's profile stored in the user database 110. The user's identity is validated only when a match between the voices is found.

The identity validation engine 104 adds an extra later of user identity management and protection to the web service engine 102, which provides an existing web service, by utilizing KBAs for initial user identity validation and PCQs for subsequent password-free access by a validated user without prompting the user for PIN or password. Such a combined KBA and PCQ approach can effectively address at least the following four issues for identity management and protection:

- Authentication of the user trying to access the web service provided, by validating the user's identity first through the use of KBAs and later through the use of PCQs.
- Authorization of services the user is allowed to access, by granting the web service only to that particular validated user.
- Administration of services provided, by setting rule to allow only validated users to contact other validated users and how such contacts can be made.
- Audition of services provided, by keeping records of requests and access to the web service by the user in the user database 110, which can be secure encrypted. Compliance with security can be confirmed by keeping an audit trail of when and by whom access was made, what validation efforts were made and successful as well as when unauthorized access has been attempted.

Figure 2:
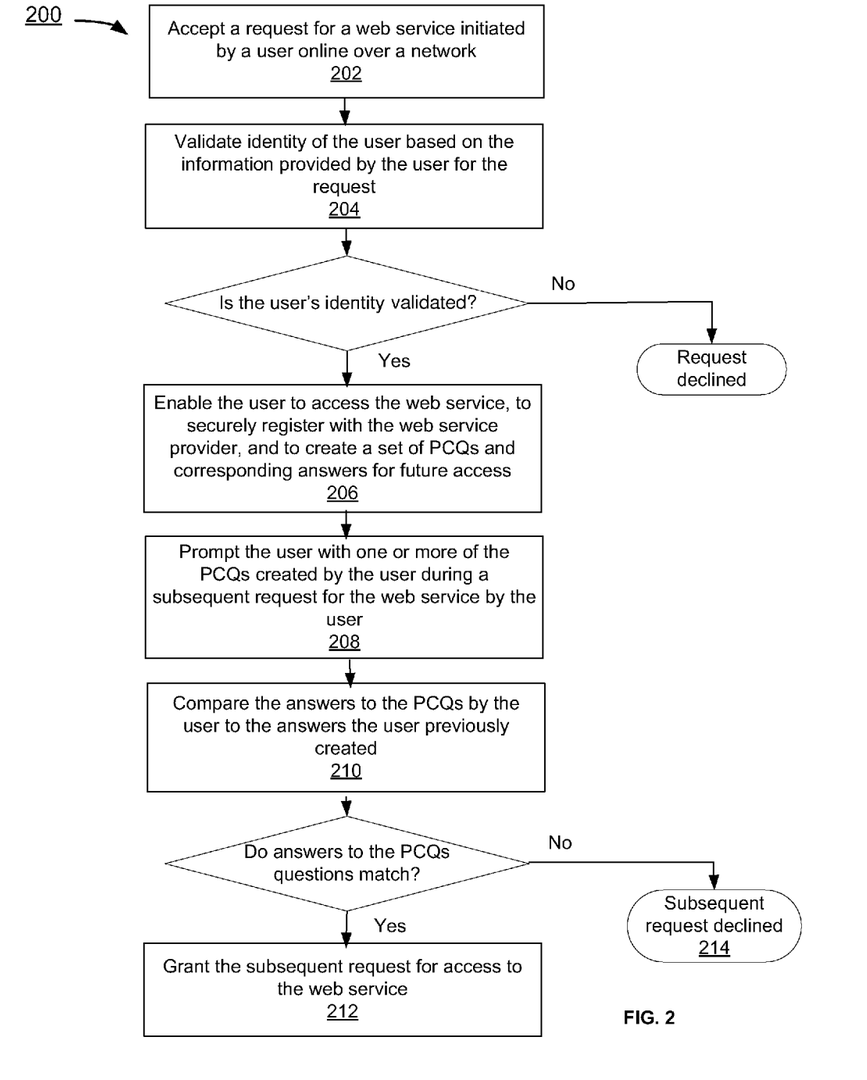
FIG. 2 depicts a flowchart of an example of a process to support password-free access for validated users.

FIG. 2 depicts a flowchart of an example of a process to support password-free access for validated users. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where a request for web service initiated by a user online over a network is accepted by a web service provider. In one embodiment, the user is physically present at the merchant's store or facility. The flowchart 200 continues to block 204 where identity of the user is validated based on the information provided by the user for the request, such as name, address, and telephone number. Here, the identity validation may be conducted by some third party, which may be separate from the web service provider. If the user's identity is validated, the flowchart 200 continues to block 206 where the validated user is allowed to access the web service, to securely register with the web service provider, and to create a set of PCQs and corresponding answers for future access. The flowchart 200 continues to block 208 where the user is prompted with one or more of the PCQs created by the user instead of PIN/password during the user's subsequent request for the web service. The flowchart 200 continues to block 210 where the answers to the PCQs by the user are compared to the answers the user previously created. The flowchart 200 ends block 212 where the user's subsequent request for access to the web service is granted if the answers to the PCQs match. Otherwise, the flowchart 200 ends block 214 where the user's subsequent request for access to the web service is denied if the answers to the PCQs do not match. It is understood that the variations described for FIG. 2 and elsewhere herein remain unaffected and also apply to flowchart 200.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the embodiments of the claimed subject matter has been provided for the purposes of illustration and description. It is not intended to be exhaustive or to limit the invention to the precise forms disclosed. Many modifications and variations will be apparent to the practitioner skilled in the art. The same functions may be further distributed, involve additional parties, multiple parties may perform the same role, a party may perform multiple roles or functions, and/or functions may be performed by one entity on behalf of another entity identified herein. An insurance policy issued to an online merchant engine may be issued to the entity owning or operating (or on whose behalf the online merchant engine is operated) the online merchant engine, and the online merchant engine may or may not record information regarding the insurance policy. When a service operates an online merchant engine for multiple merchants, the service may be considered the merchant, or the usage of the online merchant engine for each of the user merchants may be treated as a separate online merchant engine. A risk management engine may be part of the online merchant engine or a separate component, perhaps operated by the entity that operates the third-party identity validation engine. Particularly, while the concept "interface" is used in the embodiments of the systems and methods described above, it will be evident that such concept can be interchangeably used with equivalent software concepts such as, class, method, type, module, component, bean, module, object model, process, thread, application programming interface, networking interface, and other suitable concepts. Embodiments were chosen and described in order to best describe the principles of the invention and its practical application, thereby enabling others skilled in the art to understand the invention, the various embodiments and with various modifications that are suited to the particular use contemplated. Credit cards here include debit cards, stored value cards, smart cards, or any other card or device that identifies an user or group of users to enable that user or group of users to make purchases of goods or services, obtain cash or cash equivalents, or transfer money. It is intended that the scope of the invention be defined by the following claims and their equivalents.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A system, comprising:
a memory device configured to store instructions; and
a computing device configured to execute the instructions stored in the memory device to:
validate an identity of an individual requesting initial access to an online merchant by:
generating at least one knowledge based authentication (KBA) question based on at least one of a credit history or a transaction history of the individual in response to receiving a validation request from the online merchant; and
determining valid at least one response corresponding to the at least one KBA question by the individual;
enable the individual to select at least one personalized challenge question (PCQ) and to provide an answer to the at least one PCQ in response to validating the identity of the individual; and
enable subsequent access to the online merchant by the individual in response to comparing the answer to a subsequent answer to the at least one PCQ from the individual without prompting the individual for a personal identification number or a password.

2. The system of claim 1, wherein the computing device is further configured to execute the instructions stored in the memory device to:
store and manage the credit history or the transaction history of the individual in the memory device.

3. The system of claim 2, wherein the computing device is further configured to execute the instructions stored in the memory device to:
communicate over a network via communication interfaces or application programming interfaces (APIs) with the online merchant.

4. The system of claim 1, wherein the computing device is further configured to execute the instructions stored in the memory device to:
deny the identity of the individual in response to the at least one response to the at least one KBA question not being received in a timely manner.

5. The system of claim 1, wherein the computing device is further configured to execute the instructions stored in the memory device to:
determine valid the at least one response corresponding to the at least one KBA question based on objectively grading the at least one response to the at least one KBA question.

6. The system of claim 5, wherein the computing device is further configured to execute the instructions stored in the memory device to:
deny access to the online merchant by the individual in response to the validation of the identity of the individual.

7. The system of claim 1, further comprising:
a database configured to store the at least one PCQ, the answer, and the subsequent answer to the at least one PCQ.

8. The system of claim 7, wherein the computing device is further configured to execute the instructions stored in the memory device to:
retrieve the at least one PCQ or the subsequent answer to the at least one PCQ from the database.

9. The system of claim 7, wherein the computing device is further configured to execute the instructions stored in the memory device to:
record accesses to the online merchant by the individual in the database.

10. The system of claim 1, wherein the computing device is further configured to execute the instructions stored in the memory device to:
randomly select the at least one PCQ from a set of PCQs.

11. The system of claim 1, wherein the computing device is further configured to execute the instructions stored in the memory device to:
utilize an interactive voice response (IVR) system to validate the identity.

12. A method, comprising:
validating, using a processing device, an identity of a user in response to a request for access to an online merchant by the user by:
generating knowledge based authentication (KBA) questions based on at least one of a credit history or a transaction history of the user in response to receiving a validation request from the online merchant;
verifying a response to at least one of the KBA questions by the user; and
granting the request for access to the user in response to the verifying the response; enabling, using the processing device, the user to create personal challenge questions (PCQs) and to provide first answers to the PCQs in response to validating the identity of the user;
prompting, using the processing device, the user with at least one of the PCQs in response to a subsequent request for access to the online merchant by the user; and
granting, using the processing device, the subsequent request for access in response to comparing the first answers to a second answer to the least one of the PCQs without prompting the user for a personal identification number or a password.

13. The method of claim 12, further comprising:
denying the request for access to the user in response to the user not replying to the KBA questions in a timely manner.

14. The method of claim 12, further comprising:
grading the response to the at least one KBA question;
granting the request for access to the user in response to the grading.

15. The method of claim 12, further comprising:
keeping records of request and access to the online merchant by the user.

16. The method of claim 12, further comprising:
randomly selecting a set of the PCQs for prompting the user.

17. The method of claim 12, further comprising:
validating the identity of the user in response to an interactive voice response (IVR) system.

* * * * *

UNITED STATES PATENT AND TRADEMARK OFFICE
CERTIFICATE OF CORRECTION

| | | |
|---|---|---|
| PATENT NO. | : 8,515,847 B2 | Page 1 of 2 |
| APPLICATION NO. | : 12/142727 | |
| DATED | : August 20, 2013 | |
| INVENTOR(S) | : Schultz | |

It is certified that error appears in the above-identified patent and that said Letters Patent is hereby corrected as shown below:

Title page, column 1, Item [63] "Related U.S. Application Data" delete "filed on May 9, 2008." and insert therefor -- filed on May 9, 2008, which is also a Continuation-in-Part of US Application 11/789,495, filed April 24, 2007, now abandoned, which claims priority to US Provisional Application 60/863,746, filed October 31, 2006. --.

On Title Page 2, Item [56], References Cited, under "OTHER PUBLICATIONS", in Column 2, Line 7, delete "of te" and insert -- of the --, therefor.

In the Drawings

In Fig. 1, Sheet 1 of 2, in Box "102", in Line 1, delete "Web site engine" and insert -- Web service engine --, therefor. (See attached sheet.)

In the Specification

Column 1, line 13, delete "Schultz, and all of which are hereby incorporated by reference." and insert therefor -- Schultz, and which is also a Continuation-in-Part of US Application 11/789,495, filed April 24, 2007, now abandoned, which claims priority to US Provisional Application 60/863,746, filed October 31, 2006, all of which are hereby incorporated by reference." --.

In Column 5, Line 54, delete "wed service" and insert -- web service --, therefor.

In Column 6, Line 42, delete "web site engine" and insert -- web service engine --, therefor.

Signed and Sealed this
Thirteenth Day of May, 2014

Michelle K. Lee
*Deputy Director of the United States Patent and Trademark Office*